United States Patent [19]
O'Hanlon

[11] 4,089,366
[45] May 16, 1978

[54] MEANS AND METHODS FOR SENDING HEAT DOWNWARDLY

[76] Inventor: Edward J. O'Hanlon, Assembly Point, Lake George, N.Y. 12845

[21] Appl. No.: 744,166

[22] Filed: Nov. 22, 1976

[51] Int. Cl.² ............................................. F28D 15/00
[52] U.S. Cl. ...................................... 165/1; 165/105; 126/271
[58] Field of Search ............................ 165/45, 105, 1; 126/271

[56] References Cited
U.S. PATENT DOCUMENTS

| | | | |
|---|---|---|---|
| 2,068,549 | 1/1937 | Knight | 165/105 X |
| 3,951,204 | 4/1976 | Movick | 165/106 X |

*Primary Examiner*—Albert W. Davis, Jr.

[57] ABSTRACT

Ordinarily and naturally heat, once freed, tends to travel upwardly. Here means and a method causes heat to travel downwardly, to heat any out of sight area where warmth is required.

3 Claims, 1 Drawing Figure

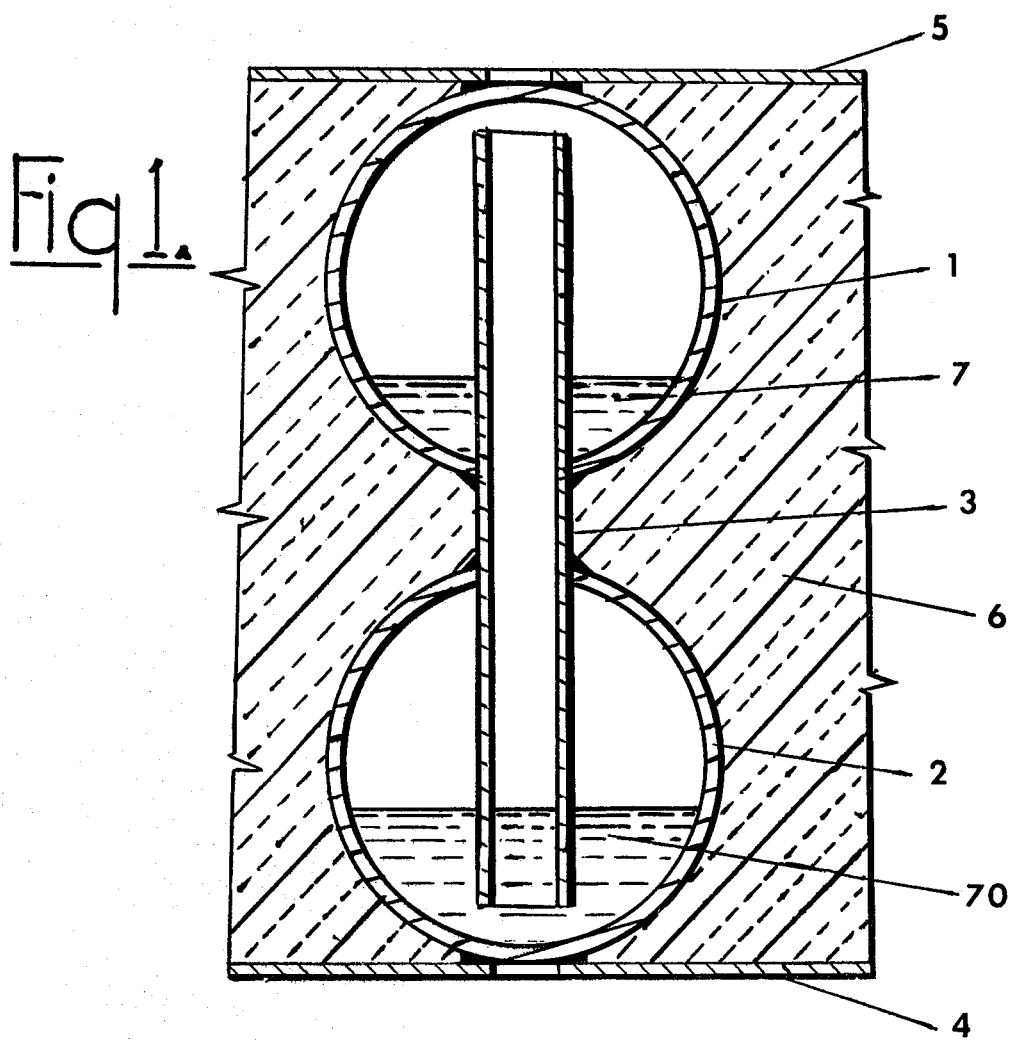

MEANS AND METHODS FOR SENDING HEAT DOWNWARDLY

Here I show means and method for transferring heat downwardly to an out of sight area. This is particularly applicable to the reception, transport, and storage of solar heat in a manner that prevents its prompt loss back to the sky if the sky clouds over.

Likewise when incorporated in the roof of any shelter structure it can provide internal solar warmth to the structure and at a minimum construction and maintainence cost.

In the drawings

FIG. 1 shows one of my units for receiving and sending heat downwardly. In FIG. 1, numeral 1 is an upper sheet metallic container, 2 is a lower sheet metal container positioned under it, 3 is a metallic passage way joining container 1 and container 2 together and reaching almost to the top of container 1 and almost to the inner bottom surface of container 2. All tubular and container contacts and connections are permanently sealed and made leak proof so no liquid sulphur dioxide or sulphur dioxide fumes can possibly escape and become obnoxious.

Numeral 4 represents a sheet metal surface fastened by welding or brazing to the bottom of container 2, numeral 5 being a similar sheet of metal fastened by welding or brazing to the top of container 1. Around the outer surfaces of containers 1 and 2 and tubular passage way 3 is packed heat insulation material 6, in this case rigid polyurethane foam.

Within the upper container 1 I show a supply of liquid sulphur dioxide 7. It need not fill the entire container but could occupy at least the bottom one-third thereof.

As previously noted the upper outlet of tubular passage 3 approaches near, but does not touch, the inner upper top surface of container 1 while the bottom opening of tubular passage approaches near but does not touch the inner bottom of container numeral 2.

The upper surface of sheet metal plate 5 is blackened to better receive and absorb heat from the rays of the sun.

Means of loading the upper container 2 with the needed liquid sulphur dioxide is not shown on the drawings.

When container 1 is partially filled with sulphur dioxide the combined apparatus is ready to function to send heat downwardly during the day time.

If it is solar heat, then as the blackened surface metal sheet 5 gives its heat to container 1 this causes the sulphur dioxide in container 1 to vaporize sending the solar heated vapor downward through the metal passage way 3 into container 2. Since container 2 is cooler than container 1, the vapor of liquid 7 condenses and becomes condensate 70. Then at nightime container 1 cools drawing the liquid 70 back up into container 1 where it later repeats the performance of sending heat downwardly.

I claim:

1. In a means for sending heat downward, a pair of metallic containers one above the other and connected by a metallic tubular passageway, said passageway reaching almost to the inner bottom of the lower container and almost to the inner top of the upper container, one of said containers partially filled with liquid sulphur dioxide and all tubular and container contacts and connections permanently sealed and made leak proof so no sulphur dioxide fumes can possibly excape.

2. A method of sending heat downward including having an upper metallic container, and another metallic container below it, both containers connected by a metallic tubular passage way, extending almost to the top of the upper container and almost to the bottom of the lower container, all tubular and container contacts and connections permanently sealed and made leakproof so no sulphur dioxide fumes can possibly escape there from, positioning a pool of liquid sulphur dioxide in said upper container, heating said upper container thus causing said liquid sulphur dioxide to vaporize and move downward through said tubular passage way as a vapor into said lower container and condensing said vapor in said lower container.

3. The invention set forth in claim 2 including the return of the liquid condensate into the upper container.